United States Patent [19]
Neber

[11] Patent Number: 5,906,571
[45] Date of Patent: May 25, 1999

[54] CENTRIFUGAL SORTER

[75] Inventor: Fritz Neber, Schwaebisch Hall, Germany

[73] Assignee: Groninger & Co. GmbH, Crailsheim, Germany

[21] Appl. No.: 09/039,119

[22] Filed: Mar. 13, 1998

[30]     Foreign Application Priority Data

Mar. 15, 1997 [DE] Germany ............................ 197 10 820

[51] Int. Cl.[6] ................................ B04B 5/00; B04B 9/00
[52] U.S. Cl. ................................................ 494/50; 494/84
[58] Field of Search .......................... 494/43, 44, 50–52, 494/64, 67, 84, 85

[56]             References Cited

U.S. PATENT DOCUMENTS

| 513,832 | 1/1894 | Seymour | 494/52 |
| 5,389,041 | 2/1995 | Schmitt | 494/52 |
| 5,507,715 | 4/1996 | Masuno et al. | 494/51 |

FOREIGN PATENT DOCUMENTS

| 0 474 142 A2 | 3/1991 | European Pat. Off. . |
| 0 729 906 A2 | 9/1996 | European Pat. Off. . |
| 34 02 139 C2 | 12/1988 | Germany . |

*Primary Examiner*—Charles E. Cooley
*Attorney, Agent, or Firm*—Michael J. Striker

[57]             ABSTRACT

A centrifugal sorter has a horizontally inclined rotatably driven feed plate and a ring drivable about an approximately vertical axis by means of a ring drive device, which surrounds the feed plate in a substantially horizontal orientation and provides a delivery location for the workpieces fed outwardly and upwardly from the container under the influence of centrifugal force approximately in the vicinity of its highest peripheral section The wall of the ring is spherical sector shaped The ring has an approximately horizontal ring surface at a lower outer edge, with which the ring bears on several rollers which are equally spaced from each other around the circumference of the ring surface and which form a friction drive together with the ring surface. At least one of the rollers is driven rotatably by a drive device and the others can be coupled to it for example by belt drive devices.

29 Claims, 2 Drawing Sheets

CENTRIFUGAL SORTER

BACKGROUND OF THE INVENTION

The invention relates to a centrifugal sorter comprising a motor driven feed plate inclined relative to a horizontal and driven by means of a drive device about an inclined rotation axis, the motor driven feed plate forming a base of a container for workpieces; and a ring rotatable about an approximately vertical axis by means of another drive devices wherein the ring surrounds the feed plate, is substantially horizontal and provides a delivery location for the workpieces fed outwardly and upwardly from the container under the influence of centrifugal force approximately in the vicinity of the highest peripheral section of the feed plate. The container wall is spherical sector shaped and the other drive device has a drive member driven by a motor which acts on the outer side of the ring to rotate it.

A centrifugal sorter of this type is known from European Patent Application EP 729 906 A2, in which the ring is enclosed under the plate with spacing and is supported vertically, axially and radially like a top by means of a suitable bearing mechanism. This top is connected with a drive mechanism for rotating it, which has a control gear driven by a motor, which meshes with a ring gear which is mounted on the underside of a circular flange. The circular flange is arranged around the upper outer edge of a ring or guide member and is formed approximately like a truncated cone which tapers in an upward direction. Thus the drive device associated with the ring is located in the upper outer region of the ring. The feed plate arranged inside the ring is inclined and has a drive device which is located under the feed plate and thus above the base or bottom of the container. The container bottom is thus a fixed mounting member for the drive device associated with the feedplate.

This known centrifugal sorter is not suitable for a steam sterilization in an autoclave in regard to its parts which come into contact with the workpiece. The container together with the circular flange and ring gear connected with it cannot be disassembled so that it may be fed to an autoclave for steam sterilization and then again reassembled. This is also true for the feed plate inside the container which is not detachable from its drive mechanism located under it. The known centrifugal sorter also allows no sterilization and no isolation technique in an assembled operating state, in which a bell is inverted over the centrifugal sorter, which is sealed tightly to the centrifugal sorter and surrounds an interior protected zone and remains there permanently during operation. A sterilization in an assembled operating state of the centrifugal sorter can be performed by means of this bell usually at the beginning of the operating cycle. In this sterilization air inside the bell is dried and then e.g. the water content is replaced by a suitable sterilization medium, e.g. $H_2O_2$ (hydrogen peroxide), which has a sterilizing effect. The parts of the centrifugal sorter inside the bell are sterilized by evacuating and again feeding the sterilizing medium into the bell. After that the sterilizing medium is rinsed out of the bell and then replaced by a laminar flow of fresh air which is maintained through the bell. An aggressive atmosphere is maintained in the above-described so-called isolator technique, to which the selected or particular individual materials are not exposed to as in the known centrifugal sorter. In the known centrifugal sorter the drive mechanism of the ring with all components and also the drive mechanism for the feed plates with all components are completely exposed to this aggressive atmosphere which thereby causes damaged to occur.

The other centrifugal sorters have approximately the same disadvantages.

SUMMARY OF THE INVENTION

It is an object of the present invention to provide a centrifugal sorter of the above-described type, which does not have the above-described disadvantages.

It is also an object of the present invention to provide a centrifugal sorter of the above-described type which is constructed as simply as possible and has a simple drive device for the ring, which allows an easy demounting or removing of the ring, e.g. for a steam sterilization in an autoclave, and after that an easy reassembly of the centrifugal sorter.

According to the invention, the centrifugal sorter comprises a container for workpieces including a motor driven feed plate inclined relative to a horizontal, having an inclined rotation axis and forming a base of the container; a drive device for rotatably driving the motor driven feed plate about the inclined rotation axis; a ring surrounding the motor driven feed plate in a substantially horizontal orientation and providing a delivery location approximately in the vicinity of a highest peripheral section of the feed plate for the workpieces fed outwardly and upwardly from the container under the influence of centrifugal force when the drive device is driven rotatably, the ring comprising a spherical sector shaped wall with an approximately horizontal ring surface on an outer peripheral surface thereof; another drive device for driving the ring rotatably about an approximately vertical rotation axis, wherein this other drive device includes a motor and driven member driven by the motor which acts on the outer peripheral surface of the ring to rotatably drive the ring; a plurality of rollers arranged at the same height as the ring surface and spaced approximately equally from each other in a circumferential direction around the ring surface, wherein the ring bears, is supported and is centered on the rollers via the ring surface and the rollers are each friction rollers which together with the ring surface form a friction drive, and wherein at least one roller is rotatably driven by means of this motor.

The object of the invention is attained by the centrifugal sorter according to the invention. The drive device associated with the ring is considerably simplified so that the ring is simply demounted by merely lifting it upward and is separable from its drive device and in a reverse sense is easily assembled by merely dropping it on the rollers so that it is again coupled with the drive mechanism or drive device. Because of that, the essential prerequisites are fulfilled so that the ring, e.g., can be easily and simply removed e.g. for the purpose of a steam sterilization in an autoclave.

Various preferred embodiments are possible. For example, the rollers extend approximately vertically through the tabletop, which is sealed in the vicinity of the rollers and another drive device together with the aforementioned drive means are arranged under the tabletop. A sleeve is provided for each roller through which a roller shaft is guided rotatably for each roller. Each sleeve passes through the tabletop and is sealed to the tabletop or each sleeve sits on the tabletop sealed from the table top and an interior region between each roller shaft and the sleeve is sealed in a region above the tabletop.

In various preferred embodiments the feed plate is mounted releasable on a plate bearing member, which extends above the tabletop and is connected with the drive device for the feed plate and the drive device is sealed under the tabletop separated from an upper region above the tabletop. The plate bearing member is held on an inclined shaft supported in a shaft sleeve that is mounted sealed on the tabletop or passes through the tabletop and is sealed to the tabletop. The interior between the inclined shaft and the shaft sleeve is then advantageously sealed in a region above the tabletop.

The upper region above the tabletop is advantageously sealed in the preferred embodiments from a lower region below the tabletop.

In some embodiments the tabletop is provided with feet and means for holding the feet spaced from the tabletop. The ring has an outer peripheral edge and a removable ring flange at its outer peripheral edge at the same height as the delivery location for the workpieces and the ring has a guide device for guiding the workpieces at the same height as the delivery location.

In various preferred embodiments the centrifugal sorter also has a guide device for guiding the workpieces, a ring flange for the ring and means for releasing and removing the feed plate and/or the ring and/or the ring flange and/or the guide device for sterilization of the components that contact the workpieces, including steam sterilization in a separate sterilizer For this purpose advantageously the ring is made from a forged rotary part. The feed plate is at least weakly cone shaped tapering and pointing upward. At least the feed plate and/or ring and/or ring flange and/or guide device are made from a rust-resistant and acid-resistant stainless steel, such as V4A, or have smooth surfaces and the smooth surfaces are pore-free or have comparatively few pores.

For example, the ring surface can be provided on a lower outer edge portion of the ring or a ring enlarged portion of the ring. In a preferred embodiment the ring surface includes an approximately truncated cone shaped inclined surface tapering downward in an axial direction of the ring. In various preferred embodiments each of the rollers is rotatably mounted so as to be rotatable about a vertical rotation axis. Each roller has an approximately truncated cone shaped bearing surface tapering or narrowing in an upward axial direction. The ring surface of the ring is connected to an approximately circular cylindrical outer surface on the ring below the ring surface. Each roller has an approximately cylindrical outer surface connected to the bearing surface under the bearing surface. Advantageously the ring is centered with the outer surface between the rollers and the rollers bear with the outer surfaces of the rollers on the outer surface of the ring.

In one preferred embodiment there are four rollers spaced 90° from each other around the ring surface. At least one roller is made of rubber or plastic at least on the cylindrical outer surface and/or supporting surface thereof. Advantageously the motor for driving the at least one roller is provided with a control gear. The rollers are advantageously drivable rotatably by means of a plurality of belt drives connected to the at least one roller driven by the motor.

Additional preferred embodiments are possible Because of these preferred features and advantages not only is a simple and easy disassembly of the ring possible but also the other parts coming in contact with the workpieces are simply and easily disassembled or demounted for the purposes of sterilization in an autoclave. After that a simple and easy assembly is possible. Furthermore these preferred embodiments fulfill all the prerequisites for a sterilization in the assembled operating state of the centrifugal sorter and subsequent laminar flow through the apparatus with damaging the components by action of an aggressive sterilization medium Because the drive device for the ring with all of its remaining drive elements and the drive device for the feed plate with all of its associated drive elements is arranged under the tabletop, the components in danger of being damaged by an aggressive sterilization are protected by the tabletop which keeps the aggressive sterilization medium far removed from the region under the tabletop in an isolation operation. Because of a suitable sealing of the elements of the centrifugal sorter, which extend above the tabletop, they a penetration of the medium through the tabletop and to its underside is prevented. It is further of advantage that the number of components in the centrifugal sorter is reduced as much as possible. The sorter is thereby compact, comparatively inexpensive and the space it requires is reduced. Thus the centrifugal sorter is useable as a stand-alone operating unit and is connectable and installable as a stand-alone structural unit.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
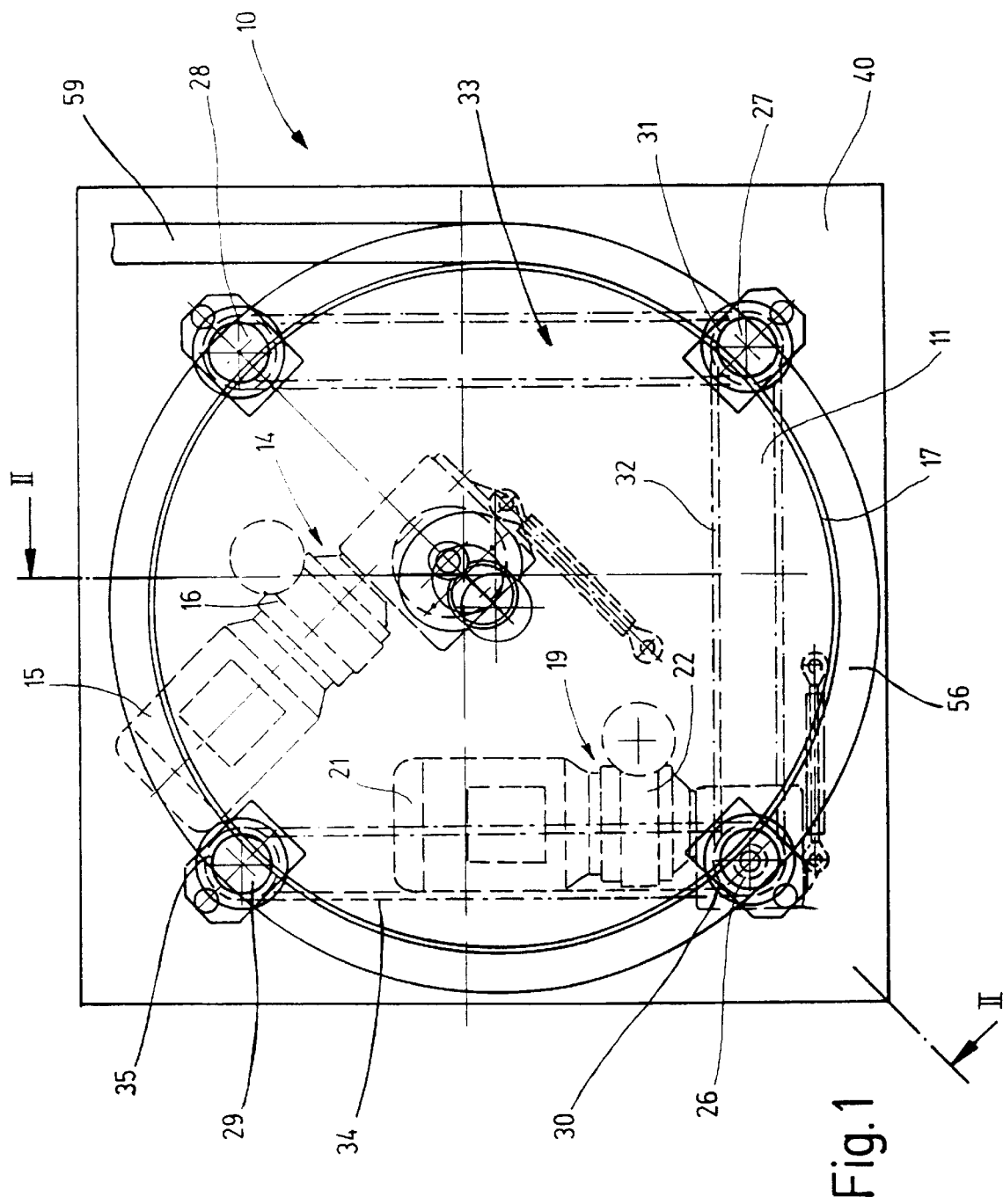
FIG. 1 is a schematic top view of a centrifugal sorter or separator.

A centrifugal sorter 10 is shown schematically in the drawing, which sorts loosely piled workpieces of any type, e.g. of medicine bottles made of plastic or the like. The centrifugal sorter 10 is a completely independent or standalone structural unit, which can be attached to other devices, units or apparatus.

The centrifugal sorter has a feed plate 11, which forms the bottom or base of a container 12 for receipt of workpieces. The feed plate 11 is at least gently conical. It is inclined relative to the horizontal and is drivable about an axis 13 inclined to the vertical by means of a motorized drive device 14. The drive device 14 has a motor 15 with a control gear 16.

The container 12 is further formed by a ring 17, whose wall 18 is approximately shaped like a spherical section. The ring 17 is oriented substantially horizontally and surrounds the feed plate 11. It provides a delivery location in the vicinity of the highest peripheral section of the feed plate 11 shown to the right in FIG. 2 for workpieces fed from the container 12 outward and upward under the influence of centrifugal force. The ring 17 is drivable about an approximately vertical axis 19 by means of another drive device 20, which includes a motor 21 with a control gear 22.

The ring 17 has an at least approximately horizontal circumferential ring surface 23 on its outer side, which is in one piece with the ring 17. The ring surface 23 is provided on a ring thickened portion 24. It is advantageously a somewhat truncated cone shaped inclined surface tapered inward in the direction of the axis 19 in FIG. 2 and is connected to a somewhat circular cylindrical outer surface 25 under it. The ring surface 23 is provided in the embodiment shown on the lower outer edge of the ring 17. In other unshown embodiments the ring surface 23 may be arranged either further up or on the upper edge of the ring 17. Space is saved because of the arrangement on the lower outer edge of the ring 17, which has a smaller diameter than at the lower outer edge than at the upper outer edge because of the hemispherical shape. Moreover this has mechanical technical advantage.

Figure 2:
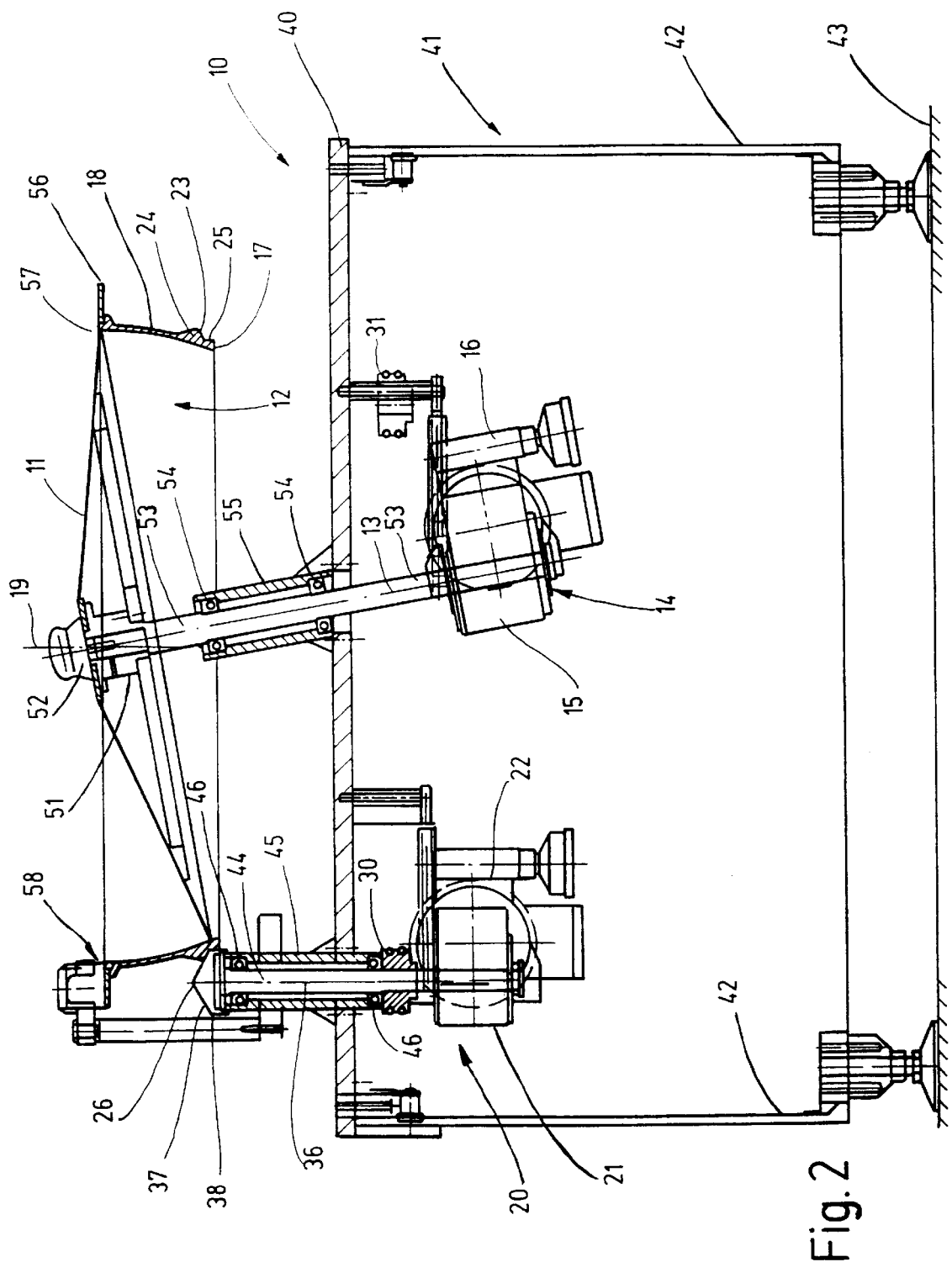
FIG. 2 is a cross-sectional view through the centrifugal sorter of FIG. 1 taken along the section line II—II of FIG. 1.

Several rollers 26 to 29 are arranged at the same height as the ring surface 23, of which only the one roller 26 is shown in FIG. 2. The rollers 26 to 29 are arranged with approximately equal angular spacing around the periphery or circumference of the ring surface 23. Four rollers 26 to 29, which are arranged spaced 90° from each other in a peripheral or circumferential direction, are provided in the embodiment shown in the drawing. The rollers 26 are friction rollers, on which the ring 17 is placed, supported and centered with its ring surface 23 in the direction of the axis 19. The ring 17 is liftable and removable easily and quickly upwardly from the rollers 26 and 29 in the direction of the axis 19. The rollers 26 to 29 together with the ring surface 23 of the ring 17 form a friction wheel drive for the ring 17. At least one of the rollers, in the illustrated embodiment the roller 26, is drivable by means of a motor 21 with a control gear 22. Also the other rollers 27 to 29 are drivable rotatably by means of a rotational drive mechanism including respective drive belts engaged with one of the other rollers. The drive for the roller 27 is derived from the drive of the roller 26 by means of two belt pulleys 30 and 31 and a belt 32 slung around them. The drive of the other roller 28 is derived from a corresponding drive belt from that of the roller 27. The drive of the roller 29 is driven analogously to that for roller 27 from the drive of the roller 26 and for course by means of a drive belt 34, which connects the belt pulley 30 with belt pulley 35. At least one of the rollers, preferably all of the rollers 26 to 29, are made of rubber or plastic, at least one their upper side which bears on the ring surface 23 and as needed with the outer surface 25. The ring 17 is already sufficiently centered between the rollers 26 to 29 by means of the ring surface 23, with the ring 17 resting on the rollers 26 to 29. If necessary the approximately circular cylindrical outer surface 25 of the ring 17 can be used to provide an additional centering. Each roller 26 to 29 is mounted rotatably about a substantially vertical axis, which is illustrated in FIG. 2 for the roller 26 by the axis 36. Each roller 26 to 29 has a somewhat truncated cone-shaped tapered bearing surface pointing upward, as illustrated in FIG. 2 for the roller 26 only by the supporting surface 37 shown there. A cylindrical outer surface 38 connects to the bearing surface 37 under it for each roller 26 to 29. The ring 17 sitting on the rollers 26 to 29 is located with its ring surface 23 in the vicinity of the bearing surface 37, which takes the vertical weight and causes a centering to occur because of the inclination. As needed an additional centering can be provided in which the ring 17 is centered with the outer surface 25 between the rollers 26 to 29 in such a manner that the outer surface 38 of the rollers 26 to 29 bears on the outer surface 25. The weight of the ring 17 is sufficiently large so that the rollers 26 to 29 are pressed with a sufficient pressing force so that the ring 17 is rotated about its axis 19 on driving the rollers 26 to 29. The feed plate 11 is driven by means of its drive device 14 in the same rotation direction as the ring 17 however, e.g. at a correspondingly higher rotation speed. The diameter of the feed plate 11 for adjustment of the inner dimensions of the ring 17 is selected so that only as small as possible a circular gap is present between the ring 17 and the feed plate 11, which is less than the smallest size of the workpieces being sorted and conveyed by the centrifugal sorter 10.

The centrifugal sorter 10 has an substantially horizontal tabletop 40, above which the ring 17, the feed plate 11 and the rollers 26 to 29 are arranged. The tabletop 40 is held with spacing from the floor or mounting surface 43 by means for suitable feet 41, e.g. via adjustable height supporting columns or members 42. Generally the tabletop 40 is a sealing plate which tightly seals or separates the region above it from that below it. This is illustrated in detail.

The rollers 26 to 29 are mounted on approximately vertical shafts, of which only the shaft 44 of the roller 26 is shown in FIG. 2. The following structural details for the roller 26 are the same for the other rollers. The shaft 44 extending through the tabletop 40 with a sealing means between the shaft 44 and the tabletop 40. The drive device 20 together with the drive means engaging on the respective shafts, like the shaft 44, are arranged under the table-plate 40. The shaft 44 is mounted and guided in a sleeve 45 by means of bearings 46. The sleeve 45 of the shaft 44 is guided downward through the sealing means and through the tabletop 45. The lower bearing 46 is arranged in the sleeve 45 under the tabletop 40. The interior between the shaft 44 and the sleeve 45 is sealed in the region above the tabletop 40, e.g. in the vicinity of the upper bearing 46. Material cannot pass downward to the region of the drive device 20 neither through the interior between the shaft 44 and the sleeve 45 nor through the opening through in the tabletop 40 which the shaft 44 and the sleeve 45 pass. The rollers 27 to 29 also have a suitable shaft 44 inside a sleeve 45 with bearings 46 analogous to the roller 26. If the sleeve 45 cannot be fit through the tabletop 40, the sleeve 45 can also be mounted and sealed on the upper surface of the tabletop 40.

The feed plate 11 is mounted from above on the plate bearing member 51 and held releasable on it, e.g. with a manually releasable and/or tightenable nut 52. The plate bearing member 51 extends above the tabletop 40. It is connected with the drive device 15 that rotatably drives the feed plate 11 about the axis 13. The drive device 14 is arranged under the tabletop 40 and it is sealed from the upper region extending upward from the tabletop 40 to the feed plate 11. The plate bearing member 51 is mounted on an inclined plate shaft 53, which extends through a plate sleeve 55 on the bearing 54. The plate sleeve 55 is either sealed on the top side of the tabletop 40 or e.g. analogously to the sleeve 45 extends guided downward through the tabletop 40 and sealed to the tabletop 40. The interior between the plate shaft 53 and plate sleeve 55 is sealed in a region above the tabletop 40. The shaft 53 is guided downward through the tabletop 40 and/or the sleeve 55 with sealing and connects there with the drive device 14, which is arranged under the tabletop 40. Because of this structure, no medium or material can arrive from the top of the tabletop 40 in the region containing the drive device 14. Otherwise the tabletop is not broken through. Because of this and based on the sealing provided in the vicinity of the location where the shaft 53 passes through the table, the tabletop 40 thus forms a sealing element or member which separates the region above it from the region below it.

The ring 17 can have a ring flange 56 which is removable from the ring and which is substantially at the upper outer peripheral edge of the ring about at the same level as the delivery location 57. This ring flange 56 is secured or fixed in relation to the ring 17 to prevent rotation e.g. as needed by means of a vertical pin or projection which is shaped to fit or engage in a suitable recess in the ring 17. This ring flange 56 is however releasable from the ring 17 from above and thus can be easily and/or quickly removed and/or placed again on the ring. The workpieces, which are conveyed to the delivery location 57, are forced on the top side of the ring flange 56 during operation of the centrifugal sorter. The ring 17 can have an approximately horizontally extending only schematically illustrated guide device 58 for guiding the workpieces at the level of the delivery location 57 in the vicinity of its upper edge. The guide device 58 can have e.g. at least one approximately vertical rim which acts as a stop for workpieces fed to the ring flange 56 and conducts them in a curved or circular arc shaped path until on the take off section 59. The guide device 58 can be formed e.g. in the standard way. It is rapidly and simply removed and installed in the same way as the feed plate 11, the ring 17 and the ring flange 56. The guide device 58 e.g. can be mounted releasable on the sleeve 45 according to its structure.

The ring 17 is preferably a forged rotary part. The feed plate 11 and/or the ring 17 and/or the ring flange 56 and/or the guide device 58 have a surface which is as smooth as possible and has a minimum of pores and can even be pore-free. They are releasable and removable, especially for sterilization, particularly steam sterilization, in a separate sterilizer in another location, especially an autoclave.

The feed plate 11 and/or the ring 17 and/or the ring flange 56 and/or the guide device 58 are advantageously made from rust- and acid-resistant stainless steel, 3.g. from V4A. Also the parts of the drive devices 14 and 20 located above the tabletop 40, e.g. the shafts 44,53 and sleeves 45,55 are advantageously made from the same material.

The centrifugal sorter in the above described form has the advantage that the parts coming in contact with the workpieces may be quickly and easily removed and introduced into an autoclave for steam sterilization and after the stream sterilization can be easily and quickly reassembled into a functioning unit. If this steam sterilization is to be performed, e.g. the feed plate 11 is first released from the plate bearing member 51 and lifted off it, then the guide device 58 is released and removed, the ring flange 56 and the ring 17 are lifted from the rollers 26 to 29. All these parts, which are comparatively uncomplicated and relatively light, may be quickly removed and transported to an autoclave at another location in which the steam sterilization is performed. After that these parts may be quickly and easily assembled again. The assembly and disassembly may be accomplished quickly and without problems. The parts of the centrifugal sorter 10 which come in contact with the workpieces are thus available for steam sterilization in an autoclave in a simple way.

However the centrifugal sorter 10 is formed so that it allows a sterilization in the assembled operable state and subsequently a so-called laminar flow on it. In this method an approximately bell-shaped container is inverted on the top side of the tabletop 40 and covers the parts located above the tabletop 40 sealing to the tabletop 40. The container covers an inner protected region or zone. It remains in place for the duration of the operation. At the beginning of the operation the sterilization occurs, e.g. by drying the air inside the inverted container and then by replacing the water content inside it by hydrogen peroxide which has a sterilizing but not a cleaning effect. By evacuating and again supplying the interior to the container is sterilized and after that the medium is rinsed from it and replaced then by fresh air, with which a laminar can be maintained in the interior in operation of the centrifugal sorter. An aggressive atmosphere is provided in this above-described so-called isolator technique. This is based on the consideration that in the above-described centrifugal sorter the feed plate 11, the ring 17, the ring flange 56 and e.g. the guide device 58 are made from rust- and acid-resistant stainless steel, which is also true for the drive parts which extend above the tabletop 40. Furthermore this isolator technique is also based on the described centrifugal isolator 10 in which the drive devices 14 and 20 are sealed under the tabletop 40 and also components otherwise guided through the tabletop 40 are sealed in relation to the tabletop 40. Because of that no aggressive medium can arrive under the tabletop 40 and cannot penetrate in the region between the shafts 44,53 and the sleeves 45,55, where the respective bearings are located. Based on this sealed separation between the region above the tabletop 40 and the region under the latter the aggressive medium used in the isolator technique cannot reach all those parts and thus does not damage them.

The disclosure of German Patent Application 197 10 820.2 of Mar. 15, 1997, is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in a centrifugal sorter, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A centrifugal sorter comprising a container (12) for workpieces, wherein said container (12) comprises a motor driven feed plate (11) and said motor driven feed plate forms a base of said container, has an inclined rotation axis (13) and is in an orientation inclined relative to a horizontal;

a drive device (14) for rotatably driving the motor driven feed plate (11) about the inclined rotation axis (13);

a ring (17) surrounding the motor driven feed plate (11), having a substantially horizontal orientation around the feed plate and providing a delivery location approximately in the vicinity of a highest peripheral section of said feed plate (11) for said workpieces in operation when said workpieces are fed outwardly and upwardly from the container (12) under the influence of centrifugal force when said feed plate (11) is driven rotatably by said drive device (14), wherein said ring (17) comprises an approximately spherical sector shaped wall with an approximately horizontal ring surface (23) extending around an outer peripheral surface thereof;

another drive device (20) for driving said ring (17) rotatably about an approximately vertical rotation axis (19), wherein said another drive device (20) includes a motor (21) and driven member driven by said motor (21) which acts on said outer peripheral surface of said ring (17) to rotatably drive said ring;

a plurality of rollers (26 to 29) arranged at a height approximately equal to that of said ring surface (23) and spaced approximately equally from each other in a circumferential direction around said ring surface (23), wherein said ring (17) bears, is supported and is centered on said rollers (26 to 29) via said ring surface (23) and said rollers (26 to 29) are each friction rollers which together with said ring surface (23) of said ring (17) form a friction drive, and at least one of said rollers (26 to 29) is rotatably driven by means of said motor (21).

2. The centrifugal sorter as defined in claim 1, wherein said ring surface is provided on a lower outer edge portion of said ring (17).

3. The centrifugal sorter as defined in claim 1, wherein said ring surface is provided on a ring enlarged portion (24) of the ring (17).

4. The centrifugal sorter as defined in claim 1, wherein said ring surface (23) comprises an approximately truncated cone shaped inclined surface tapering downward in an axial direction of said ring (17).

5. The centrifugal sorter as defined in claim 1, wherein each of said rollers (26 to 29) is rotatably mounted so as to be rotatable about a vertical rotation axis.

6. The centrifugal sorter as defined in claim 1, wherein each of said rollers (26 to 29) has an approximately truncated cone shaped bearing surface (37) tapering or narrowing in an upward axial direction.

7. The centrifugal sorter as defined in claim 6, wherein the ring surface (23) of the ring (17) is connected to an approximately circular cylindrical outer surface (25) on the ring (17) below said ring surface (23).

8. The centrifugal sorter as defined in claim 7, wherein each of said rollers (26 to 29) has an approximately cylindrical outer surface (38) connected to said bearing surface (37) under said bearing surface (37).

9. The centrifugal sorter as defined in claim 8, wherein said ring (17) is centered with said outer surface (25) between said rollers (26 to 29) and said rollers bear with said outer surfaces (38) of said rollers on said outer surface (25) of said ring (17).

10. The centrifugal sorter as defined in claim 7, wherein at least one of said rollers (26 to 29) are made of rubber or plastic at least on said cylindrical outer surface (38) and/or said bearing surface (37).

11. The centrifugal sorter as defined in claim 1, wherein a plurality of said rollers (26 to 29) consists of four of said rollers spaced 90° from each other around said ring surface (23).

12. The centrifugal sorter as defined in claim 1, wherein said motor (21) for driving the at least one roller (26) has a control gear (22).

13. The centrifugal sorter as defined in claim 1, wherein said rollers (26 to 29) are drivable rotatably by means of a plurality of belt drives (30 to 35) connected to said at least one roller driven by said motor (21).

14. The centrifugal sorter as defined in claim 1, wherein said ring (17), said feed plate (11) and said rollers (26 to 29) are arranged above an approximately horizontal tabletop (40).

15. The centrifugal sorter as defined in claim 14, wherein said rollers (26 to 29) extend approximately vertically through the tabletop (40), said tabletop (40) is sealed in vicinity of said rollers and said another drive device (20) together with drive means (21,22, 30 to 35) are arranged under the tabletop (40).

16. The centrifugal sorter as defined in claim 15, further comprising a sleeve (45) for each of said rollers through which a roller shaft (44) of each of said rollers (26 to 29) is guided and rotatably mounted and wherein each of said sleeves (45) passes through said tabletop (40) and is sealed to said tabletop (40) or each of said sleeves sits on said tabletop (40) sealed from said table top and an interior region between each of said roller shafts (44) and said sleeve (45) is sealed in a region above said tabletop (40).

17. The centrifugal sorter as defined in claim 14, wherein said feed plate (11) is mounted releasably on a plate bearing member (51), said plate bearing member (51) extends above the tabletop (40) and is connected with said drive device (14) for said feed plate (11) and said drive device (14) is sealed under said tabletop separated from an upper region above said tabletop (40).

18. The centrifugal sorter as defined in claim 17, wherein said plate bearing member (51) is held on an inclined shaft (53) supported in a shaft sleeve (55) that is mounted sealed on said tabletop (40) or passes through said tabletop (40) and is sealed to said tabletop (40).

19. The centrifugal sorter as defined in claim 18, wherein an interior between said inclined shaft (53) and said shaft sleeve (55) is sealed in a region above said tabletop (40).

20. The centrifugal sorter as defined in claim 14, further comprising an upper region above said tabletop (40) and a lower region below said tabletop (40) and means for sealing said upper region from said lower region comprising said tabletop (40).

21. The centrifugal sorter as defined in claim 14, wherein said tabletop (40) is provided with feet (41) and means for holding said feet spaced from said tabletop (40).

22. The centrifugal sorter as defined in claim 1, wherein said ring (17) has an outer peripheral edge and a removable ring flange (56) at said outer peripheral edge at a level of said delivery location (57).

23. The centrifugal sorter as defined in claim 1, wherein said ring (17) has a guide device (58) for guiding said workpieces at a level of the delivery location (57).

24. The centrifugal sorter as defined in claim 1, further comprising a guide device (58) for guiding said workpieces, a ring flange (56) for said ring (17) and means for releasing and removing said feed plate (11) and/or said ring (17) and/or said ring flange (56) and/or said guide device (58) for sterilization including steam sterilization in a separate sterilizer.

25. The centrifugal sorter as defined in claim 24, wherein said ring (17) is made from a forged rotary part.

26. The centrifugal sorter as defined in claim 24, wherein said feed plate (11) is at least slightly cone shaped tapering and pointing upward.

27. The centrifugal sorter as defined in claim 24, wherein at least said feed plate (11) and/or said ring (17) and/or said ring flange (56) and/or said guide device (58) has a smooth surface and said smooth surface is pore-free or has comparatively few pores.

28. The centrifugal sorter as defined in claim 24, wherein at least said feed plate (11) and/or said ring (17) and/or said ring flange (56) and/or said guide device (58) are made from rust-resistant and acid-resistant stainless steel.

29. The centrifugal sorter as defined in claim 28, wherein said stainless steel is V4A.

* * * * *